G. T. BECKERS.
TIRE.
APPLICATION FILED APR. 30, 1908.
920,523.
Patented May 4, 1909.
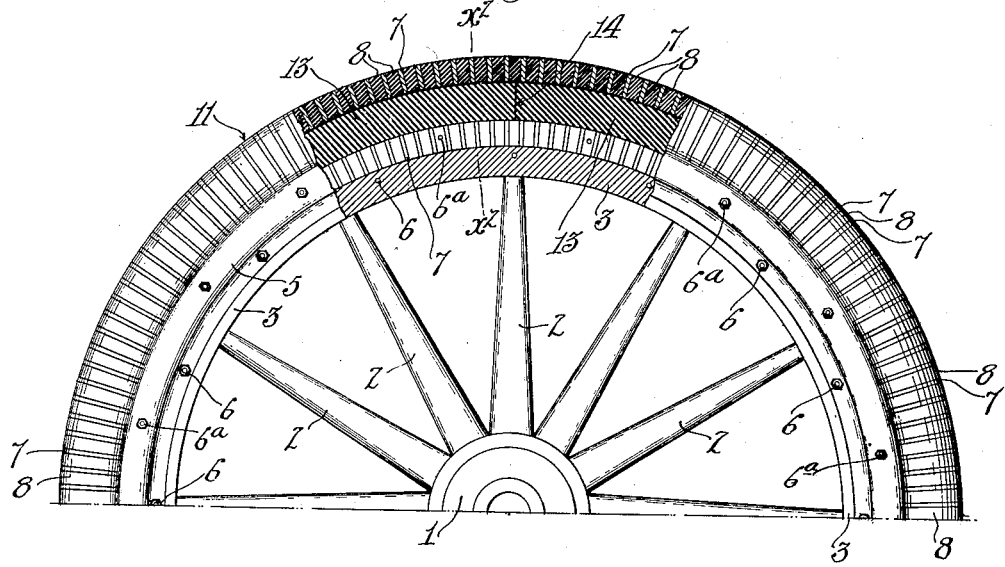
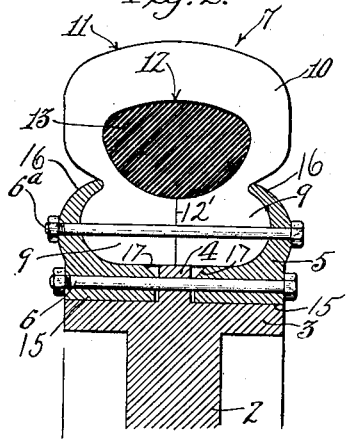
Witnesses:-
Louis W. Gratz.
Frank L. Graham.
Inventor,
George T. Beckers.
by
Townsend & Auerbachley
attys

UNITED STATES PATENT OFFICE.

GEORGE T. BECKERS, OF LOS ANGELES, CALIFORNIA.

TIRE.

No. 920,523.  Specification of Letters Patent.  Patented May 4, 1909.

Application filed April 30, 1908. Serial No. 430,230.

*To all whom it may concern:*

Be it known that I, GEORGE T. BECKERS, a citizen of the United States, residing at Los Angeles, in the county of Los Angeles and State of California, have invented a new and useful Tire, of which the following is a specification.

This invention relates to a tire adapted for use on vehicle wheels, and the object of the invention is to provide a tire which is resilient and which can be very economically constructed and easily and cheaply repaired.

A further object is to provide a novel means for attaching the tire to the rim of the wheel, whereby the entire tire, or any piece or portion thereof, may be removed when it is desired to renew a portion of the tire.

The accompanying drawings illustrate two forms of the invention, and referring thereto.

Figure 1 is a side elevation of half of a wheel equipped with one form of the tire, a portion of the tire being shown in the section. Fig. 2 is an enlarged section on line $X^2$—$X^2$ Fig. 1.

Referring to the form shown in Figs. 1 and 2, 1 designates the hub of the wheel having spokes 2 which support the rim 3. As shown in Fig. 2, the rim 3 has a central annular rib 4. Slidable on the rim 3 on each side of the rib 4 are clamping rings 5 which have concave inner faces as indicated. Bolts 6 pass at intervals through the lower portions of rings 5 and through the rib 4 and serve to hold the rings 5 in place on the rim and afford means for contracting rings 5 to clamp the tire between them.

The tire in the form shown consists of a series of rubber sheets 7 which are arranged radially of the wheel, and between each rubber sheet 7 is a leather sheet 8 similar in contour and preferably being thicker than the rubber sheets. The rubber sheets 7 and the leather sheets 8 are both tapered slightly so that each face of a sheet of rubber or leather lies in a plane radially of the hub. As shown in Fig. 2, each sheet has a lower portion 9 with a straight lower edge which rests upon a seat formed by the rings 5, the outer edges of each bottom portion 9 being curved convexly as shown to conform to and fit the inner concave faces of the rings 5, and the rings 5 being drawn toward each other by bolts 6 to securely clamp the sheets in position on the rim. Bolts 6$^a$ pass through the outer part of rings 5 and through certain of the leather sheets to hold all the sheets against creeping and to prevent the rings 5 from springing out. The upper portion 10 of each sheet is wider than the lower portion and has an outer curved edge 11 which forms the tread surface of the tire. Each sheet has a central orifice 12 so that an annular internal space is formed through the entire length of the tire, which space is filled with a rubber core 13. The latter may be a continuous rubber ring or may be formed in sections. For example, there may be four sections forming the complete circle. In Fig. 1, two of these sections are shown, the line of separation between the two sections shown being indicated at 14 Fig. 1.

The sheets 7 and 8 may be punched out by means of a die and thus may be very economically formed. If desired, the rubber may be molded to the desired shape instead of being punched. Each sheet is slit below the orifice 12 as shown at 12' so that it may be sprung apart to permit removal or insertion over the rubber core 13. The slit preferably extends down at right angles to the flat edge of the base or portion 9 so as to cause the slit edges to abut squarely against each other, and midway between the sides of the lower portion 9, so that they will rest upon the flange 4 and will thereby take up the pressure against the tire as effectively as though the sheets were formed continuous or unslitted. The width of the base 15 of the ring 5 is a trifle less than the distance from the outer edge of the rim 3 to the flange 4 so that when the rings are drawn inward by the bolt 6$^a$ so as to cause their flanges 16 or curved portions to engage with the sides or beads of the portion 9, there will be a slight space between the inner end of each flange 15 and the flange 4 to permit of the curved flanges being drawn against the beads or sides of the tire with sufficient pressure to prevent any movement of the tire except inward from its tread or face. The upper corner or edge of the flange 15 is also preferably beveled or cut off as at 17 to permit of the ring being more readily slipped in under the bead upon the side or edge of the portion 9. Each sheet is preferably wedge shaped so that external pressure on any one sheet, when the tire is in service, will be partially transmitted from a sheet laterally in both directions to the adjacent sheets, so that the entire compression strain is partly borne by several sheets though pressure is applied to the edge of one sheet only, as, for example, when the tire rolls over a small pebble or thin object. This construction prevents undue longitudinal pressure inward on each sheet tending to force it inwardly which would be apt to buckle the sheet if it were formed with parallel faces.

Should a portion of the tire become injured it is a very easy matter to repair the same as the injured sheets may be removed by first removing one or both of the rings 5. Each sheet readily separates at the bottom so as to slip off the rubber 13, after which the sheets would be inserted and the clamping rings 5 then screwed up to clamp the same in position.

What I claim is:—

In a wheel, a rim provided with a centrally located circumferentially projecting flange, a tire thereon comprising a series of radially arranged sheets, each having a flat base and a central aperture, the ends of the base being rounded to form a bead upon each side of the tire when completed, said sheets being each slitted from the aperture to said base midway between said ends, whereby the edges of the slitted portions will abut against each other and will rest at their lower portions on said flange on the rim, a ring upon each side of said wheel having two flanges, one of which projects inward between said sheets and said rim and the other one is curved and extends over the bead upon that side of the wheel, the width of the inner flange being less than the distance from the edge of the rim to said first named flange and having its inner edge beveled on top, a series of bolts through said rings, the bolts passing through the base of certain of said sheets and a second series of bolts through the flange on said rim and through said rings.

In testimony whereof, I have hereunto set my hand at Los Angeles, California, this 20th day of April 1908.

GEORGE T. BECKERS.

In presence of—
GEORGE T. HACKLEY
FRANK L. A. GRAHAM